Dec. 8, 1959 C. W. BAUGH, JR 2,916,545

AUTOMATIC FREQUENCY CONTROL SYSTEM FOR TELEVISION RECEIVER

Filed May 22, 1957 2 Sheets-Sheet 1

WITNESSES:
Bernard R. Giegucz
Leon J. Vaga

INVENTOR
Charles W. Baugh, Jr.
BY J J Callahan
ATTORNEY

United States Patent Office 2,916,545

Patented Dec. 8, 1959

2,916,545

AUTOMATIC FREQUENCY CONTROL SYSTEM FOR TELEVISION RECEIVER

Charles W. Baugh, Jr., Montgomery Township, Somerset County, N.J., assignor to Westinghouse Electric Corporation, East Pittsburgh, Pa., a corporation of Pennsylvania Application May 22, 1957, Serial No. 660,870

9 Claims. (Cl. 178—5.8)

This invention relates generally to television receivers and, more particularly, to automatic frequency control systems for them.

In standard television systems, it is the practice to transmit the picture signals on one carrier wave and to transmit the complementary sound signals on an adjacent carrier wave.

In a television receiver of the type utilizing an intercarrier sound system, the picture and sound intermediate frequency signals are amplified in the same intermediate frequency amplifier, and an intercarrier sound signal is derived by heterodyning the picture and sound intermediate frequency signals. The intercarrier sound frequency corresponds to the difference between the picture and sound carrier frequencies and in standard television systems, is 4.5 megacycles.

It has been the practice in the design of a television receiver of the intercarrier sound type to employ some sort of attenuation circuits to control the sound carrier level relative to the picture carrier level. These attenuation circuits, although helping to shape the overall picture intermediate frequency response curve, are essentially provided to prevent beats in the second detector between the sound carrier and high frequency video components in a monochrome video receiver. In a single second detector type of color television receiver, an even greater attenuation is usually required at the accompanying sound carrier frequency to prevent beats between the color components and the sound carrier.

It is highly desirable that the frequency of the local oscillator, in both monochrome and color television receivers, be controlled in order to control the frequency of the intermediate frequency sound signal to effect adequate rejection to the accompanying sound carrier by the attenuation circuits. In the prior art, various systems utilizing conventional frequency discriminators have been proposed for providing frequency control of the sound intermediate frequency. This type of control is not entirely satisfactory since there is a tendency for a conventional frequency discriminator control to drift in frequency relative to the operating frequency of the attenuation circuit.

In a television intercarrier sound receiver, if local oscillator drift takes place, the 4.5 megacycle intercarrier sound signal remains unchanged in frequency, but the intermediate frequency sound signal may fall on a portion of the intermediate frequency response curve where the attenuation is not satisfactory. Also, if local oscillator drift allows the video intermediate frequency carrier to move from its correct position on the intermediate frequency response curve slope, proper vestigial sideband reception will not be achieved and poor picture quality will result.

In present monochrome and color television receivers, it has generally been found necessary for satisfactory sound and color-sound performance respectively to provide a fine tuning control knob on the front panel of the receiver to make a precise adjustment of the frequency of the local oscillator. In a color television receiver, the fine tuning control knob is usually required to compensate for 920 kilocycle beat between the color subcarrier and the sound carrier and to keep the color response at a satisfactory level. If the intermediate frequency sound signal is properly attenuated in the intermediate frequency stage of the receiver, then the color subcarrier, being near to the intermediate frequency sound carrier, will be highly sensitive by reason of its position near the rapidly falling portion of the frequency response characteristic of the intermediate frequency passband. Hence, fine tuning is needed to ensure that the color subcarrier lies on the correct point of the frequency response characteristic to achieve the desired transient response.

In copending application Serial No. 658,202, filed May 9, 1957, entitled "Television Apparatus," by Kenneth E. Farr, and assigned to the present assignee, there is disclosed an automatic frequency control system for an intercarrier type television receiver which makes use of the level of the intercarrier sound wave to control the frequency of the local oscillator. The system disclosed in that copending application is limited in its control of local oscillator drift to approximately ±0.8 megacycle. This range of control is satisfactory for drift in the local oscillator of a very high frequency (VHF) tuner, but it is highly desirable that such an automatic frequency control system have a greater control range when an ultra high frequency (UHF) tuner is used in conjunction with such a television receiver.

The present invention provides an automatic frequency control system for an intercarrier type television receiver, similar in some respects to the automatic frequency control system of the aforementioned application, but which includes means for increasing the range of control of the local oscillator drift.

It is, accordingly, an object of the present invention to provide an improved automatic frequency control system for an intercarrier type television receiver.

It is another object of the present invention to provide an automatic frequency control system for an intercarrier type television receiver which makes use of the level of the intercarrier sound wave and the change in level of the direct current component of the second detector to effect control of the frequency of the local oscillator.

These and other objects are effected by my invention as will be apparent from the following description taken in accordance with the accompanying drawings throughout which like reference characters indicate like parts, and in which.

Figure 1:
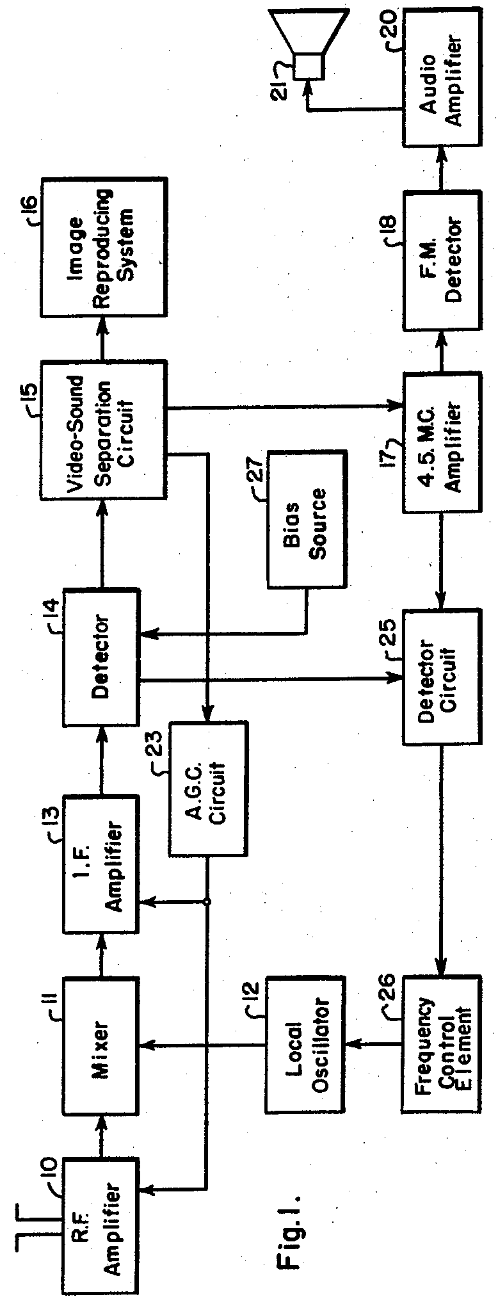
Fig. 1 is a block diagram of a television receiver embodying the automatic frequency control system of my invention.

The television receiver illustrated in Fig. 1 includes a radio frequency amplifier 10 which supplies both the sound and picture radio frequency carriers to a mixer 11. In accordance with present-day standards, these carriers are separated by 4.5 megacycles. The output of a local oscillator 12 is coupled to the mixer or first detector 11 and the beat frequencies produced by the heterodyning action within the mixer 11 includes the picture intermediate frequency carrier and the sound intermediate frequency carrier. The picture and sound intermediate frequencies are applied to a common intermediate frequency amplifier 13, wherein signals within a predetermined frequency range defined by the passband of the intermediate frequency amplifier are amplified. The picture and sound intermediate frequencies are applied to second detector 14 wherein the picture signals are derived from the picture intermediate frequency and the picture and sound intermediate frequency waves are heterodyned to provide an intercarrier sound wave. The video and intercarrier waves are applied to video-sound separation circuit 15 which separates the video and intercarrier sound signals. The video signals are applied to a suitable image reproducing system 16.

The intercarrier sound signal is applied to a 4.5 megacycle amplifier 17 in the sound channel of the receiver wherein it is amplified. The sound channel may comprise a frequency-modulation detector 18 and an audio amplifier 20. The output of the audio amplifier is connected to a sound-reproducing device 21.

The output from the video-sound separation circuit 15 is also connected to an automatic gain control circuit 23 of the "peak detection type" which acts in a well-known manner to control the amplification of the stages 10 and 13 in accordance with the intensities of received television signals.

The intercarrier sound signal from amplifier 17 is also applied to a 4.5 megacycle detector circuit 25, which may be included as a part of the frequency modulation detector 18. The detector circuit 25 produces a direct current signal, the magnitude of which varies as a function of the amplitude of the intercarrier sound signal. The output of the detector circuit 25 is applied to a frequency control element 26 which, in turn, controls the frequency of the local oscillator 12. The frequency control element 26 may comprise a diode which, in series with a condenser, is connected across the tank circuit of the oscillator 12, shunting a variable reactance across the tank and hence changing the frequency of the local oscillator. This variation of reactance is accomplished by varying the effective load applied to the diode to control its conduction.

The automatic frequency control system thus far described is disclosed and claimed in the copending application Serial No. 658,202 heretofore referred to. This automatic frequency control system utilizes the 4.5 megacycle intercarrier sound signal as it exists in the sound channel of the receiver. The intermediate frequency amplifier 13 has a desired frequency response characteristic. The level of the intercarrier sound signal is a function of the positions of the intermediate frequency video and sound modulated waves with respect to the desired frequency response characteristics of the intermediate frequency circuit. The automatic frequency control system utilizes the level of the intercarrier sound signal to produce a direct current signal whenever the intermediate frequency video and audio waves depart from predetermined positions with respect to the intermediate frequency circuit's desired response characteristic. This direct current signal is utilized to effect control of the frequency of the local oscillator 12 to provide automatic receiver tuning so as to maintain the ratio of the picture and sound carriers substantially constant.

In accordance with the present invention, a signal proportional to the direct current component of the output of detector 14 is applied together with the output of detector circuit 25 to the frequency control element 26 to effect control of the local oscillator 12. A source of direct current biasing voltage 27 is added to the output of detector 14 in order to provide the proper operating level for the automatic frequency control system.

Figure 2:
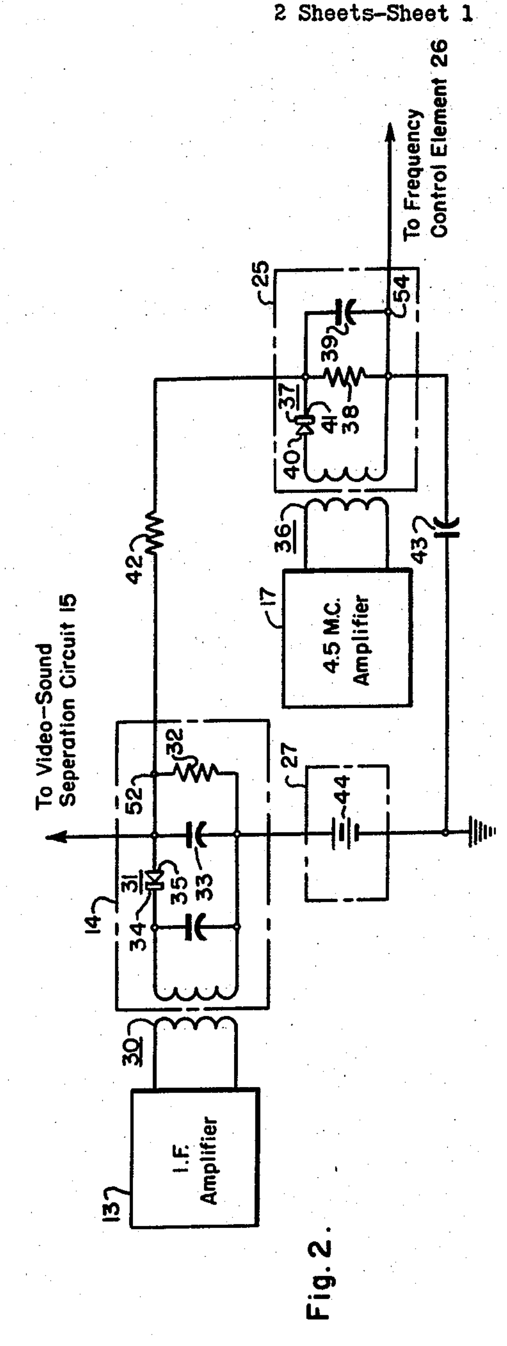
Fig. 2 illustrates a representative form of particular portions of the television receiver of Fig. 1.

In Fig. 2, a typical schematic representation of the components illustrated by some of the blocks of Fig. 1 has been shown. It will be appreciated that this schematic diagram is given by way of example only, and that numerous variations in the circuit details may be effected without departing from the spirit of the present invention.

Referring to Fig. 2 in detail, the intermediate frequency amplifier 13 is coupled by way of transformer 30 to the second detector 14. The second detector includes a germanium diode 31, or any other suitable detecting device, and has a load resistor 32 in parallel with a capacitor 33. The diode 31 has a cathode 34 and an anode 35. The anode 35 is connected to the video-sound separation circuit 15.

The 4.5 megacycle amplifier 17 is coupled by way of transformer 36 to the detector circuit 25. The detector circuit 25 includes a germanium diode 37, or any other suitable detecting device, and has a load resistor 38 in parallel with a capacitor 39. The diode 37 has an anode 40 and a cathode 41. The cathode 41 is connected by way of resistor 42 to the anode 35 of the diode 31, and is also connected through the load resistor 38 and a capacitor 43 to a point of reference potential represented as ground. The output of the detector circuit 25 is connected to frequency control element 26.

The source of direct current biasing voltage 27 is represented as a battery 44. The positive terminal of the battery 44 is connected to the detector 14 while its negative terminal is connected to a point of reference potential represented as ground.

Figure 3:
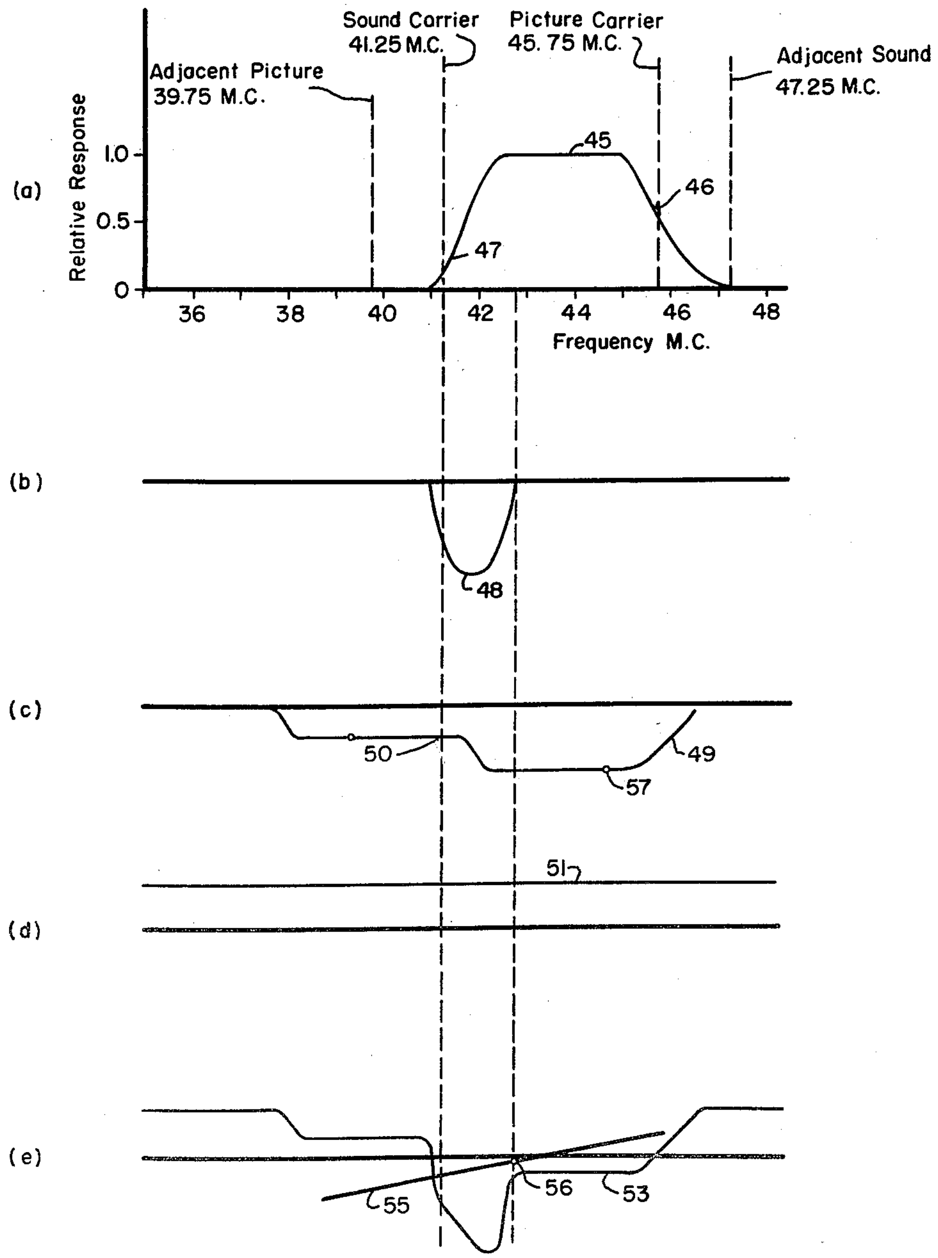
Fig. 3 shows a plurality of curves used in explaining the operation of the invention.

In Fig. 3, there is illustrated a plurality of curves which will be helpful in an understanding of the principles and operation of the automatic frequency control system of the invention. In Fig. 3*a*, there is illustrated the band pass of a suitable intermediate frequency amplifier having a frequency response characteristic indicated by the curve 45. On curve 45, point 46 represents the video or picture carrier frequency, which is approximately 6 decibels below the maximum level, and point 47 represents the center frequency of the intermediate frequency sound signals which is attenuated approximately 36 decibels below the maximum level. The amplitude of the intercarrier sound wave is largely determined by the amplitude of the smaller of the two intermediate frequency carriers which in this case is indicated by the ordinate of point 47. The frequency response characteristic of the intermediate frequency amplifier has a steep slope in the vicinity of the intermediate frequency sound carrier produced by a suitable attenuation circuit or trap.

If the positions, such as at 46 and 47, respectively, of the intermediate frequency video and sound waves are shifted with respect to the frequency response characteristic of the intermediate frequency amplifier 13, the amplitude of the intercarrier sound wave will vary. The intercarrier sound wave from the 4.5 megacycle amplifier 17 is applied to the detector circuit 25. The detector circuit 25 produces a direct current signal, the amplitude of which varies in accordance with the amplitude of the intercarrier sound wave. This direct current signal is represented by curve 48 of Fig. 3*b*. It will be seen that this direct current signal will have substantially zero values when the frequency of intermediate frequency sound wave is 41 and 42.75 megacycles respectively, and will have a maximum value when the intermediate frequency sound wave is at approximately 42 megacycles. In Fig. 3*c*, curve 49 represents the direct current component of the output of the detector 14. With the intermediate frequency video and sound waves located at the points 46 and 47, respectively, on curve 45 of Fig. 3*a*, the level of this direct current component will correspond to the level such as at point 50 in Fig. 3*c*. The automatic gain control circuit 23 will operate to hold the peak value of the signal output of detector 14 substantially constant. If the local oscillator 12 should drift and increase in frequency so that the intermediate frequency picture wave moves out of the passband of the intermediate frequency amplifier 13 and the intermediate frequency sound wave moves in a direction into the passband, then the level of this direct current component will increase. In this case, the direct current component of the signal output of the detector 14 will be substantially the same as the peak value of the output of detector 14. The curve 49 of Fig. 3*c* shows the variation in the direct current component at the output of detector 14 as the detected signal changes from an amplitude modulated video signal to the frequency modulated sound signal as the positions of the intermediate picture and sound wave are shifted by reason of the variation in the frequency output of local oscillator 12.

When the intermediate frequency picture wave is within the passband of the intermediate frequency amplifier 13 the direct current component of the signal output of detector 14 will have one value, such as at point 50, and when the intermediate frequency picture wave is outside the passband of amplifier 13 this direct current component will have a substantially different value such as at point 57. This change in level of the direct current component of the signal output of detector 14 is utilized to effect control of the local oscillator 12. In Fig. 3*d*, curve 51 represents the bias voltage applied to the detector 14 to set the proper operating level for the automatic frequency control system.

Referring again to Fig. 2, a signal proportional to the direct current component of the output of detector 14 will appear at point 52. This signal is applied through the filter resistor 42 and the resistor 38 to the frequency control element 26.

In Fig. 3*e*, curve 53 represents the control signal which appears at the point 54 in Fig. 2. This control signal is applied to the frequency control element 26 to effect control of the local oscillator 12. In Figure 3*e*, curve 55 represents a suitable frequency control characteristic for the local oscillator 12. It will be seen that there is only one crossover of curves 53 and 55 over the frequency range shown. Without the utilization of the signal proportional to the direct current component of the output of detector 14, there would be another crossover in the vicinity of point 56. Since this signal will have a high value as long as the frequency of the local oscillator 12 is such as to keep the intermediate frequency sound wave in the passband of the IF amplifier 13, then the automatic frequency control system has a range of control of drift of the local oscillator 12 equal to approximately 5 megacycles. This range of control may be substantially greater if the intermediate frequency sound wave is strong enough to maintain the level of the D.C. component at the output of the detector 14 as the intermediate frequency sound wave moves in a downward direction on the intermediate frequency picture side of the passband of the IF amplifier.

While the invention has been shown in one embodiment, numerous modifications falling within the spirit and scope of the invention will be readily apparent to those skilled in this art after the benefit of the above teachings has been obtained.

I claim as my invention:

1. In a television receiver including a local oscillator, for operation from a video modulated carrier wave of a first frequency and an associated sound modulated carrier wave of a second frequency having a predetermined relation to said first frequency, and in which said waves are amplitude detected and heterodyned to provide a detected signal proportional to the amplitude of said carrier waves and to also provide an intercarrier sound wave having an amplitude varying as a function of the amplitude of said carrier waves, means for producing a first control signal proportional to the average amplitude of said detected signal, means for producing a second control signal varying in accordance with the amplitude of said intercarrier wave, and means for applying said first and second control signals to said local oscillator to control the frequency thereof.

2. In a television receiver including a local oscillator, for operation from a video modulated carrier wave of a first frequency and an associated sound modulated carrier wave of a second frequency, having a predetermined relation to said first frequency, the video carrier wave being amplitude-modulated and the sound carrier wave being frequency-modulated, and in which said waves are amplitude detected and heterodyned to provide a detected signal proportional to the amplitude of said carrier waves and to also provide an intercarrier sound wave having an amplitude varying as a function of the amplitude of said carrier waves, means for producing a first control signal proportional to the average amplitude of said detected signal, means for producing a second control signal varying in accordance with the amplitude of said intercarrier wave, and means for applying said first and second control signals to said local oscillator to control the frequency thereof.

3. In a television receiver for receiving television signals consisting of a video modulated carrier wave of a first frequency and an associated sound modulated carrier wave of a second frequency having a predetermined relation to said first frequency, and in which means comprising a local oscillator is utilized for converting said carrier waves to intermediate frequency picture and sound carrier signals, and in which said intermediate frequency signals are amplitude detected and heterodyned to provide a detected signal proportional to the amplitude of said intermediate frequency signals and to also provide an intercarrier sound wave having an amplitude varying as a function of the amplitude of said intermediate frequency signals, means for producing a first control signal proportional to the average amplitude of said detected signal, means for producing a second control signal varying in accordance with the amplitude of said intercarrier wave, and means for controlling the frequency of said local oscillator in response to said first and second control signals.

4. In a television receiver for receiving television signals consisting of a video modulated carrier wave of a first frequency and an associated sound modulated carrier wave of a second frequency having a predetermined relation to said first frequency, and in which the output of a local oscillator is heterodyned with said carrier waves so as to develop a separate intermediate frequency wave for each of said carrier waves, an intermediate frequency circuit of sufficient band pass to transmit the two intermediate frequency carrier waves, amplitude detector and heterodyning means energized from said intermediate frequency circuit to provide an output signal proportional to the amplitude of said intermediate frequency carrier waves and to also provide an intercarrier sound wave having an amplitude varying as a function of the amplitude of said intermediate frequency carrier waves, means for producing a first control signal proportional to the average amplitude of said output signal, said first control signal being of one value when said video modulated intermediate frequency carrier wave is within the band pass of said receiver circuit and being of another substantially different value when said video modulated intermediate frequency carrier wave is outside the band pass of said receiver circuit, means coupled to said amplitude detector and heterodyning means for producing a second control signal varying in accordance with the amplitude of said intercarrier wave, and means for controlling the frequency of said local oscillator in response to said first and second control signals.

5. In a television receiver for receiving television signals consisting of a video modulated carrier wave of a first frequency and an associated sound modulated carrier wave of a second frequency having a predetermined relation to said first frequency, a first detector to which said carrier waves are applied, a local oscillator, the output of said local oscillator being coupled to said first detector for converting said television signals to intermediate frequency carrier waves, a common intermediate frequency amplifier for the intermediate frequency carrier waves, means including a second detector coupled to the output of said intermediate frequency amplifier to detect said intermediate frequency carrier waves and to heterodyne said intermediate frequency carrier waves to produce an intercarrier sound wave having an amplitude varying as a function of the amplitude of said intermediate frequency carrier waves, means for producing a first control signal proportional to the average amplitude of said detected intermediate frequency carrier waves, means coupled to said second detector for producing a second control signal varying in accordance with the amplitude of said intercarrier wave, and means for controlling the frequency of said local oscillator in response to said first and second control signals.

6. In a television receiver for receiving television signals consisting of a video modulated carrier wave of a first frequency and an associated sound modulated carrier wave of a second frequency having a predetermined relation to said first frequency, the video carrier wave being amplitude modulated and the sound carrier wave being frequency modulated, and in which the output of a local oscillator is heterodyned with said carrier waves so as to develop a separate intermediate frequency carrier wave for each of said carrier waves, an intermediate frequency amplifier circuit for the intermediate frequency carrier waves, means including an amplitude detector and energized from the intermediate frequency amplifier circuit to detect the two intermediate frequency carrier waves and to heterodyne the video and sound modulated intermediate frequency carrier waves to produce a frequency modulated intercarrier sound wave having an amplitude varying as a function of the amplitude of said intermediate frequency carrier waves, means for producing a first control signal proportional to the average amplitude of said detected intermediate frequency waves, means coupled to said amplitude detector for producing a second control signal varying in accordance with the amplitude of said frequency modulated intercarrier sound wave, and means for controlling the frequency of said local oscillator in response to said first and second control signals.

7. In a television receiver for receiving television signals consisting of a video modulated carrier wave of a first frequency and an associated sound modulated carrier wave of a second frequency having a predetermined relation to said first frequency, and in which the output of a local oscillator is heterodyned with said carrier waves so as to develop a separate intermediate frequency wave for each of said carrier waves, an intermediate frequency circuit of sufficient band width to transmit the two intermediate frequency carrier waves and having a predetermined frequency response characteristic, amplitude detector and heterodyning means energized from said intermediate frequency circuit to provide an output signal proportional to the amplitude of said intermediate frequency waves and to also provide an intercarrier sound wave having an amplitude varying as a function of the amplitude of said intermediate frequency waves, means for producing a first control signal proportional to the average amplitude of said output signal, means coupled to said amplitude detector and heterodyning means for producing a second control signal varying in accordance with the amplitude of said intercarrier wave, and means for controlling the frequency of said local oscillator in response to said first and second control signals.

8. In a television receiver for receiving television signals consisting of a video modulated carrier wave of a first frequency and an associated sound modulated carrier wave of a second frequency having a predetermined relation to said first frequency, and in which the output of a local oscillator is heterodyned with said carrier waves so as to develop a separate intermediate frequency wave for each of said carrier waves, an intermediate frequency circuit of sufficient band pass to transmit the two intermediate frequency carrier waves and having a predetermined frequency response characteristic, amplitude detector and heterodyning means energized from said intermediate frequency circuit to provide an output signal proportional to the amplitude of said intermediate frequency carrier waves, the magnitude of said output signal being determined by the positions of said intermediate frequency carrier waves with respect to said frequency response characteristic, with said positions being controlled by the frequency output of said local oscillator, and to also provide an intercarrier sound wave when both of said intermediate frequency carrier waves are within the band pass of said receiver circuit, said intercarrier sound wave having an amplitude varying as a function of the amplitude of said intermediate frequency carrier waves, means for producing a first control signal proportional to the average amplitude of said output signal, means coupled to said amplitude detector and heterodyning means for producing a second control signal varying in accordance with the amplitude of said intercarrier wave, and means for controlling the frequency output of said local oscillator in response to said first and second control signals.

9. In a television receiver for receiving television signals consisting of a video modulated carrier wave of a first frequency and an associated sound modulated carrier wave of a second frequency having a predetermined relation to said first frequency, and in which the output of a local oscillator is heterodyned with said carrier waves so as to develop a separate intermediate frequency wave for each of said carrier waves, an intermediate frequency circuit of sufficient band pass to transmit the two intermediate frequency waves and having a frequency response characteristic such that the sound modulated intermediate frequency wave is transmitted at an amplitude substantially less than the amplitude of the video modulated intermediate frequency wave when said intermediate frequency waves are located at predetermined positions with respect to said frequency response characteristic, with said predetermined positions being controlled by the frequency of the output of said local oscillator, amplitude detector and heterodyning means energized from said intermediate frequency circuit to provide an output signal proportional to the amplitude of said intermediate frequency carrier waves, the magnitude of said output signal being determined by the frequency of the output of said local oscillator, and to also provide an intercarrier sound wave when both of said intermediate frequency carrier waves are within the band pass of said intermediate frequency circuit, said intercarrier sound wave having an amplitude varying as a function of the amplitude of said intermediate frequency carrier waves, means for producing a first control signal proportional to the average amplitude of said output signal, said first control signal being of one value when said video modulated intermediate frequency carrier wave is within the band pass of said intermediate frequency circuit and being of another substantially different value when said video modulated intermediate frequency carrier wave is outside the band pass of said intermediate frequency circuit, means for producing a second control signal varying in accordance with the amplitude of said intercarrier wave, and means for controlling the frequency of said local oscillator in response to said first and second control signals.

References Cited in the file of this patent

UNITED STATES PATENTS

| | | |
|---|---|---|
| 2,664,464 | Cotsworth | Dec. 29, 1953 |
| 2,677,049 | Rogers | Apr. 27, 1954 |

FOREIGN PATENTS

| | | |
|---|---|---|
| 905,377 | Germany | Mar. 1, 1954 |